United States Patent
Seo (10) Patent No.: US 10,310,970 B2
(45) Date of Patent: Jun. 4, 2019

(54) METHOD OF AUTOMATICALLY TESTING SMART DEVICE APPLICATION PROGRAM USING PERMISSION BOOSTER

(71) Applicant: RSUPPORT CO., LTD., Seoul (KR)

(72) Inventor: Hyungsu Seo, Gyeonggi-do (KR)

(73) Assignee: RSUPPORT CO., LTD., Seoul (KR)

( * ) Notice: Subject to any disclaimer, the term of this patent is extended or adjusted under 35 U.S.C. 154(b) by 0 days.

(21) Appl. No.: 15/788,453

(22) Filed: Oct. 19, 2017

(65) Prior Publication Data

US 2018/0129595 A1 May 10, 2018

(30) Foreign Application Priority Data

Nov. 9, 2016 (KR) .................. 10-2016-0148677

(51) Int. Cl.
  *G06F 9/44* (2018.01)
  *G06F 11/36* (2006.01)
  *G06F 8/61* (2018.01)

(52) U.S. Cl.
  CPC ............ *G06F 11/3688* (2013.01); *G06F 8/61* (2013.01); *G06F 11/3672* (2013.01)

(58) Field of Classification Search
  CPC .................................................. G06F 11/3688
  USPC ........................................................ 717/131
  See application file for complete search history.

(56) References Cited

U.S. PATENT DOCUMENTS 7,721,265 B1 * 5/2010 Xu ...................... G06F 11/3664
  714/31
2014/0317615 A1 * 10/2014 Ma ............................ G06F 8/61
  717/176

FOREIGN PATENT DOCUMENTS

| JP | 2007-241851 A | 9/2007 |
| KR | 10-2004-0104130 A | 12/2004 |
| KR | 10-0641884 B1 | 10/2006 |
| KR | 10-2008-0068385 A | 7/2008 |

OTHER PUBLICATIONS

Nikolay Elenkow, "Secure USB debugging in Android 4.2.2", Feb. 20, 2013 (Year: 2013).*

* cited by examiner

*Primary Examiner* — Wei Y Zhen
*Assistant Examiner* — Lanny N Ung
(74) *Attorney, Agent, or Firm* — Mintz Levin Cohn Ferris Glovsky and Popeo, P.C.; Kongsik Kim; Derek E. Constantine

(57) ABSTRACT

The present invention relates to a method of testing an application program mounted on a smart device 10 such as a smart phone, a tablet computer or the like, in which a test target application program is automatically tested by a control program installed in the smart device 10, and an effective permission is granted to the control program through a booster 20 combined with the smart device 10. Through the present invention, a test can be automatically conducted without handling a corresponding smart device 10, in which an application program test is conducted, by the user of the smart device 10, and a test on the application program under a variety of conditions can be conducted efficiently and systematically.

13 Claims, 5 Drawing Sheets

METHOD OF AUTOMATICALLY TESTING SMART DEVICE APPLICATION PROGRAM USING PERMISSION BOOSTER

CROSS-REFERENCE TO RELATED APPLICATION

This application claims priority to Korean Application No. 10-2016-0148677 filed on Nov. 9, 2016, which is incorporated herein by reference.

TECHNICAL FIELD

The present invention relates to a method of testing an application program mounted on a smart device 10 such as a smart phone, a tablet computer or the like, in which a test target application program is automatically tested by a control program installed in the smart device 10, and an effective permission is granted to the control program through a booster 20 combined with the smart device 10.

RELATED ART

A smart devices 10, such as a smart phone, a tablet computer or the like having a high performance processing device, a large capacitance memory device and a high quality touch screen mounted thereon, gets out of being a simple communication device and is utilized as a multifunction information device for performing various application programs.

Smart devices 10 currently on the market have performance comparable or superior to general desktop computers in processing multimedia information including image and voice information, GPS-based position information, information sensed by various sensors and the like, as well as in processing digital information by itself, and their utilization is expanded in daily lives and across industry on the basis of their unique characteristic of portability.

Therefore, various application programs operating under the operating systems of the smart devices 10 are developed, and as the environments for manufacturing the application programs are widely opened by smart device 10 operating system manufacturers, manufacturing the application programs, which is the exclusive property of smart device 10 manufacturers, communication companies or the like in the past, is expanded to small or medium program development companies and general users, and quantitative and qualitative growth of the application programs for the smart devices 10 has been made explosively.

Like other software, the application programs for the smart devices 10 also go through a test for checking operation error, stability, compatibility and the like of the application programs as a final step of the manufacturing, and various methods including a basic method of handling a corresponding application program after installing the application program in a smart device 10 by the developer himself or herself of the application program, and a method of recruiting beta testers and distributing the application program may be used as a method of testing the application programs.

In testing an application program for a smart phone 10, the method of handling an application program after installing the application program in the smart device 10 by the developer himself or herself is disadvantageous in that since the developer himself or herself should perform the handling under a variety of conditions and repeat the same handling for various types of smart devices 10, it takes a long time in testing the application program, and reliability of a test result cannot be guaranteed.

Figure 1:
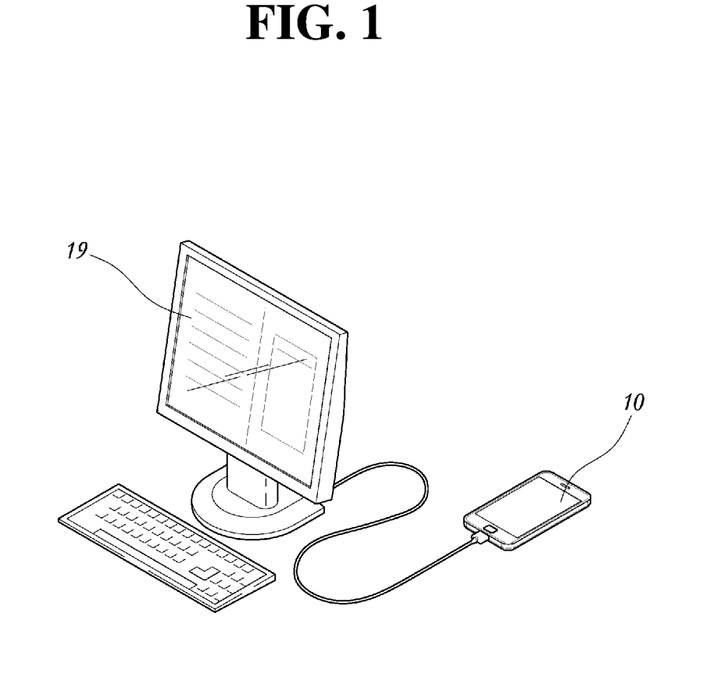
FIG. 1 is a view showing a conventional method of testing an application program of a smart device.
Figure 2:
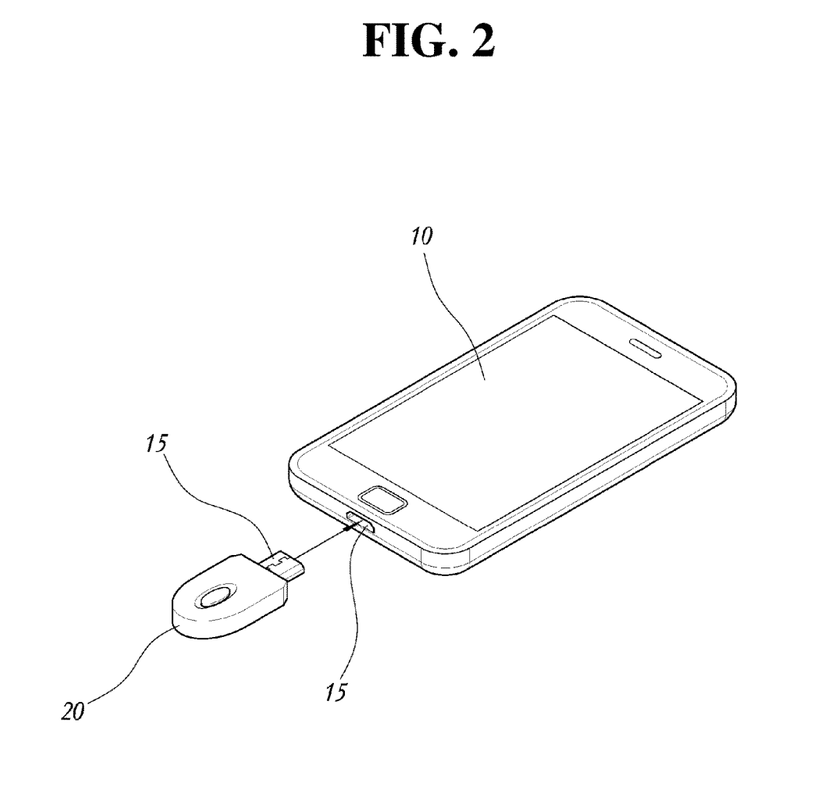
FIG. 2 is a view showing a method of combining a booster of the present invention.

Therefore, as shown in FIG. 1, a method of testing an application program mounted on a smart device 10 using a test program mounted on a computer 19 to control the smart device 10 while a data connector 15 of the smart device 10 such as a Universal Serial Bus (USB) or the like is physically connected to the computer 19 is generally used, and an example of a related conventional technique is shown in Korean Laid-opened Patent No. 2012-121950 or the like.

Such a test method is a method chiefly applied in an initial test conducted by the developer of a corresponding application program or in a so-called alpha test conducted by a small number of persons belonging to an application program development company, and although an application program test may be efficiently conducted in various and systematic scenarios without handling the smart device 10 by the developer himself or herself as the handling for testing the smart device 10 is automatically performed by connecting the smart device 10 to the computer 19 through the data connector 15, there is a problem in that the same test should be repeated for each type of smart device 10, and a test conducted under a condition perfectly reconstructing an environment of using a smart device 10 by a general user is essentially impossible.

That is, since the habits and conditions of using a smart device 10 are different depending on users, setting aside the types of smart devices 10, and interactions between a previously installed program and a test target application program cannot be estimated, various application program operating conditions should be prepared in reality although the smart devices 10 are of the same type.

Therefore, a beta test method of conducting a test under a condition closest to a real use environment is performed by recruiting a plurality of test participants and having them install and use a test target application program in their own smart devices 10, and an example of a related conventional technique is shown in Korean Laid-opened Patent No. 2016-99778 or the like.

SUMMARY

Although a beta test including Korean Laid-opened Patent No. 2016-99778, i.e., a method of recruiting general users or experts and having them actually use a test target application program, seems to be a perfect test method at a glance in that the test can be conducted in a variety of cases while maximally reflecting a real operating environment of a corresponding application program, it has a fundamental limit in that the beta tester themselves should handle the test target application program.

That is, since a conventional beta test is conducted in a method of installing a test target application program in a user's smart device 10, using the application program and notifying a result thereof to the developer of the application program by a user himself or herself, the test target application program should be handled by spending a considerable time, and in most cases, the beta testers are required to have a knowledge of an expert level in relation to a corresponding application program.

Accordingly, significant time and cost are required for recruiting and managing the beta testers, and the scale of the beta test is limited, and therefore, there is a serious difficulty in securing efficiency and reliability of the application program test.

The present invention has been conceived to test an application possible without handling a smart device 10 by a user considering the problems described above, and there is provided a method of automatically testing an application program of a smart device 10 using a permission booster, the method comprising: an installation step (step S10) of installing a target program, i.e., a test target application program, and a control program for reading a script and handling the target program in the smart device 10; a connection step (step S20) of directly connecting the booster 20 mounted with a booster program, as a device provided with a data connector 15 and a memory device, to a data connector 15 of the smart device 10; a request step (step S30) of requesting grant of an effective permission to the control program from an operating system of the smart device 10 by the booster program of the booster 20 by way of the data connector 15; an acceptance step (step S40) of granting the effective permission to the control program by the operating system of the smart device 10; and a test step (step S50) of handling the target program by the control program.

In addition, the operating system of the smart device 10 is Android, and the data connector 15 of the smart device 10 and the data connector 15 of the booster 20 are USBs, and as an ADB server and an ADB daemon are respectively installed in the booster 20 and the smart device 10, a TCP/IP communication path is established through the USBs, at the connection step (step S20); the ADB server transmits a command to the ADB daemon through the TCP/IP communication path under a control of the booster program, at the request step (step S30); and the operating system of the smart device 10 grants the effective permission to the control program as the ADB daemon receives the command, at the acceptance step (step S40).

In addition, the operating system of the smart device 10 can be the Android operating system, and the data connector 15 of the smart device 10 and the data connector 15 of the booster 20 are USBs, and as an ADB server and an ADB daemon are respectively installed in the booster 20 and the smart device 10, a TCP/IP communication path is established through the USBs, at the connection step (step S20); the ADB server transmits a command to the ADB daemon through the TCP/IP communication path under a control of the booster program, at the request step (step S30); and the operating system of the smart device 10 grants the effective permission to the control program as the ADB daemon receives the command, at the acceptance step (step S40).

DETAILED DESCRIPTION

The present invention relates to a method of testing an application program using smart phones 10 of a plurality of participants, and an application program can be tested without directly connecting a smart device 10 participating in the application program test to a separate computer 19 or without handling the smart device 10 by the user himself or herself of the smart device 10 participating in the test.

That is, in testing an application program, it does not need to connect a smart phone to a separate computer 19 such as a desktop computer, a notebook computer or the like and control the smart phone like in a general alpha test, and a user does not need to execute and handle a target program, i.e., a test target application program, by handling the smart phone by himself or herself like in a general beta test.

Particularly, since an automatic test is conducted by a control program mounted on the smart device 10 through the present invention while a beta test targeting a large number of test participants is conducted, an application program test can be conducted for the events of each diversely, precisely and systematically established scenario although general users lacking in expertise are recruited as beta testers.

Since such a method of testing an application program of a smart device 10 of the present invention is performed while a separate computer 19 is not connected to the smart device 10 as described above, a real test on an application program is conducted by the control program mounted on the smart device 10, and this is progressed as needed while the user of a corresponding smart device 10 does not recognize.

However, a permission on the operating system needs to be granted to the control program mounted on the smart device 10 to perform execution and handling of a test target application program, i.e., a target program, and this is carried out through a booster 20 physically connected to the smart device 10 through a data connector 15 as shown in FIG. 1.

Although there may be a difference according to the type of operating system of a smart device 10, it is general that a permission granted to an application program of the operating system of a smart device 10 may be largely classified into a root permission which is a top-level permission, a system permission which is a next higher permission, and a user permission which is a general user permission, and these permissions may be subdivided according to accessible regions in the operating system. To execute, control and handle a certain application program by another application program, an effective permission, i.e., a sufficient upper permission, needs to be granted to the another application program, and such an effective permission is generally set to be higher than the system permission.

That is, to execute, control and handle a target program, which is another application program mounted on a smart device 10, by a control program mounted on the same smart device 10 without separately connecting a computer, an effective permission set to be higher than a general system permission needs to be granted to the control program.

However, smart device 10 operating system manufacturers, smart device 10 manufacturers and the like stick to a policy of granting a relatively low-level permission to a general application program for the purpose of securing security, preventing increase of development cost according to detailed classification of permissions granted to each application program, securing markets of the application programs distributed by the company, and preventing erosion of the functions of performing the company's operating system by competing companies, and accordingly, it is also extremely difficult for the control program, which is a kind of general application program, to secure an effective permission.

However, as the environment of developing application programs of a smart device 10 is open like a Software Development Kit (SDK), grant of a permission to a related program is allowed to control a smart device 10 using a separate external computer while the computer is connected to the smart device 10 through a physical data connector 15 such as a USB or the like or to make it possible to do a work such as inputting a script for executing a specific event as shown in the example of the alpha test described above.

That is, in order to encourage development of application programs of the operating system of the company and construct a developer-friendly application program development environment so as to extend the market share of the operating system of the company, smart device 10 operating system manufacturers inevitably allow grant of permissions to general application programs according to the physical connection established between a computer and a smart device 10 assuming an application program development environment.

On the basis of such an idea, the present invention uses the booster 20 physically connected to the smart device 10 through the data connector 15 in granting a permission to the control program previously mounted on the smart device 10, so that the control program mounted on the smart device 10 itself as an application program may acquire an effective permission and execute, control and handle a target program.

In the present invention, the booster 20 connected to the smart device 10 is a physical device, i.e., hardware, embedded with a memory element, i.e., a memory device, and is physically combined and connected to the smart device 10 through the data connector 15 such as a USB or the like as shown in FIG. 1, and a memory element and a processor may be mounted together for smooth operation of a booster program described below.

If once the effective permission is granted to the control program by the operating system of the smart device 10 through the connection of the booster 20, the effective permission of the control program is maintained as long as the operating system of the smart device 10 is not terminated, and accordingly, the booster 20 may be separated from the smart device 10 without a problem after the effective permission is granted to the control program.

Figure 3:
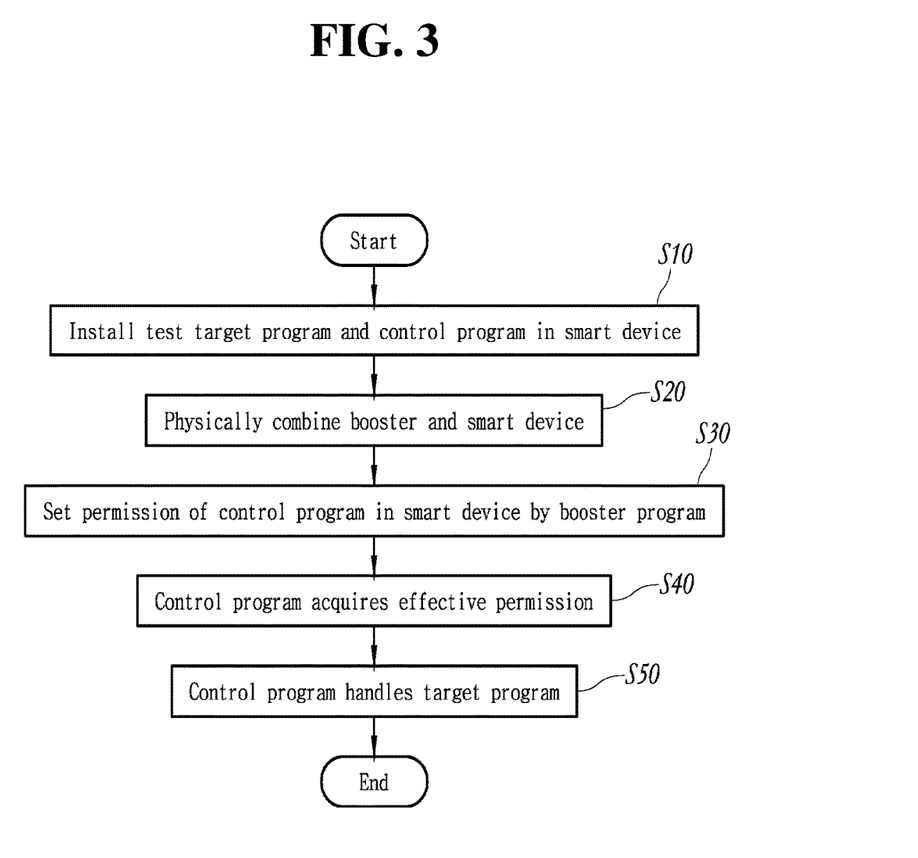
FIG. 3 is a flowchart illustrating the present invention.

Such a method of automatically testing an application program of a smart device 10 of the present invention is initiated by an installation step (step S10) of installing a target program, i.e., a test target application program, and a control program for reading a script and handling the target program in the smart device 10 as shown in FIG. 3.

At the installation step (step S10), the target program and the control program mounted on the smart device 10 are application programs of the operating system of the smart device 10 and installed and recorded in the memory device of the smart device 10.

The control program is an application program leading the overall of an actual test of a target program described below and controls or handles the target program according to the scripts of the events of various scenarios assuming an actual process of using the target program.

Here, a series of scripts used by the control program is a module of the control program and may be included in the control program itself or separated from the control program and recorded in the memory device of the smart device 10 in the form of a separate character string or database and may be encrypted to secure security in the overall test process.

If the installation step (step S10) is completed, a connection step (step S20) of directly connecting the booster 20 mounted with a booster program, as a physical device provided with a data connector 15, a processor and a memory device, to a data connector 15 of the smart device 10 is performed.

That is, as a user of the smart device 10 combines the booster 20 that the user possesses with his or her own smart device 10, a communication path between the booster 20 and the smart device 10 is established.

The booster 20 physically combined with the smart device 10 through the data connector 15 at the connection step (step S20) is small hardware manufactured by a subject of the smart device 10 application program test and distributed to the test participants. Here, the subject of the smart device 10 application program test may be a company manufacturing the application program of the smart device 10, such as a smart device 10 manufacturer, an operating system manufacturer, an application program manufacturer or the like. In addition, as a large-scale application program manufacturer, a small and medium application program developing company or a personal developer requests a test on an application program, the subject may be an application program test agent recruiting and managing beta testers and supervising the test process.

Describing a method of manufacturing, distributing and operating the booster 20 and the control program assuming a situation in which the present invention is actually performed by an application program manufacturer or an application program test agent, the application program manufacturer or the application program test agent manufactures the control program and the booster 20 and distributes them to smart device 10 users, who are recruited beta testers, and the users install the distributed control program in their smart devices 10 and possess the booster 20.

A smart device 10 user recruited as a beta tester may visit a sales office of the application program manufacturer or the application program test agent and receive the booster 20, i.e., hardware, or the application program manufacturer or the application program test agent may send the booster 20 to the smart device 10 user.

In addition, the booster 20 may be configured in such a manner that the application program manufacturer or the application program test agent described above or other information device manufacturers may manufacture a general-purpose booster 20 that is not mounted with a booster program and distribute the general-purpose booster 20 in the market, and the smart device 10 users recruited as beta testers purchase the general-purpose booster 20 and install the distributed booster program, or the smart device 10 users recruited as beta testers purchase a small external memory device combined with the data connector 15 such as a USB or the like and install the booster program.

With all the diverse methods of configuring the booster 20, since the subject of manufacturing the booster program mounted on the booster 20 and the subject of manufacturing the control program mounted on the smart device 10 are substantially the same, the process of sending identification information of the control program by the booster program at the request step (step S30) described below may be performed without a problem.

If the connection step (step S20) is completed, the request step (step S30) of requesting grant of an effective permission to the control program from the operating system of the smart device 10 by the booster program of the booster 20 by way of the data connector 15 is performed.

At the request step (step S30), the booster program may transmit identification information of the control program installed at the installation step (step S10), together with the request for granting an effective permission, to the operating system of the smart device 10 through the communication path constructed through the data connector 15. Accordingly, as an acceptance step (step S40) of granting an effective permission to the control program by the operating system of the smart device 10 is performed, the effective permission for controlling a target program is granted to the control program.

If the acceptance step (step S40) is completed and an effective permission is granted to the control program, a test step (step S50) of executing, controlling and handling the target program according to the script described above by the control program is performed, and at the test step (step S50), the control program stores a state of handling the target program and a result of executing the target program in the memory device of the smart device 10.

As the test step (step S50) is performed like this, information collected in relation to operation of the target program is transiently or temporarily stored in the memory device of the smart device 10, transmitted to a supervising server 35 or the like described below, and provided to the application program manufacturer or the application program test agent.

Figure 4:
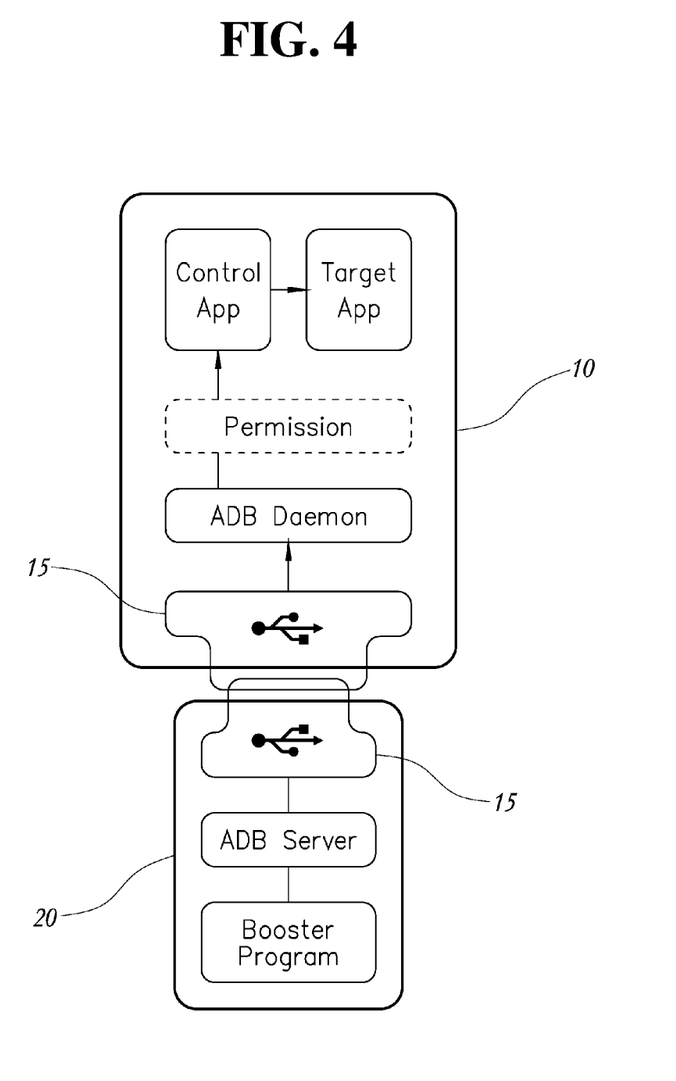
FIG. 4 is a view showing the configuration of a smart device and a booster of the present invention.

FIG. 4 is a view showing the configuration of the smart device 10 and the booster 20 of an embodiment in which the present invention described above is performed in the smart device 10 mounted with an Android operating system, and a specific process of performing the same embodiment is as described below.

In the embodiment shown in FIG. 4, the specifications of the data connector 15 of the smart device 10 and the data connector 15 of the booster 20 conform to the specification of USB, and an ADB server and an ADB daemon are installed in the booster 20 and the smart device 10, respectively.

The ADB server and the ADB daemon are programs for constructing a kind of client-server system provided by Android Debug Bridge (ADB), and the ADB server mounted on the booster 20 behaves as a server and the ADB daemon mounted on the smart device 10 behaves as a client and a resident program to mediate between the booster program and the operating system or between the booster program and the control program.

In the fourth embodiment as described above, a TCP/IP communication path through a USB pipe is established at the connection step (step S20) described above.

If once the smart device 10 and the booster 20 are physically connected through the data connector 15, i.e., a USB, a pipe that can be regarded as a logical communication path in an input-output bus is established, and the ADB server and the ADB daemon that can be expressed as logical devices are connected to each other.

At the request step (step S30) performed thereafter, the ADB server transmits a command to the ADB daemon through the TCP/IP communication path under the control of the booster program, and at the acceptance step (step S40), as the ADB daemon receives the command, the operating system of the smart device 10 grants an effective permission to the control program.

Therefore, the target program, which is an application program of the Android operating system, may be controlled by the control program, which is an application program of the Android operating system of the same status, and as described above, a test on the target program is progressed as the control program executes, controls and handles the target program according to a previously established script.

Figure 5:
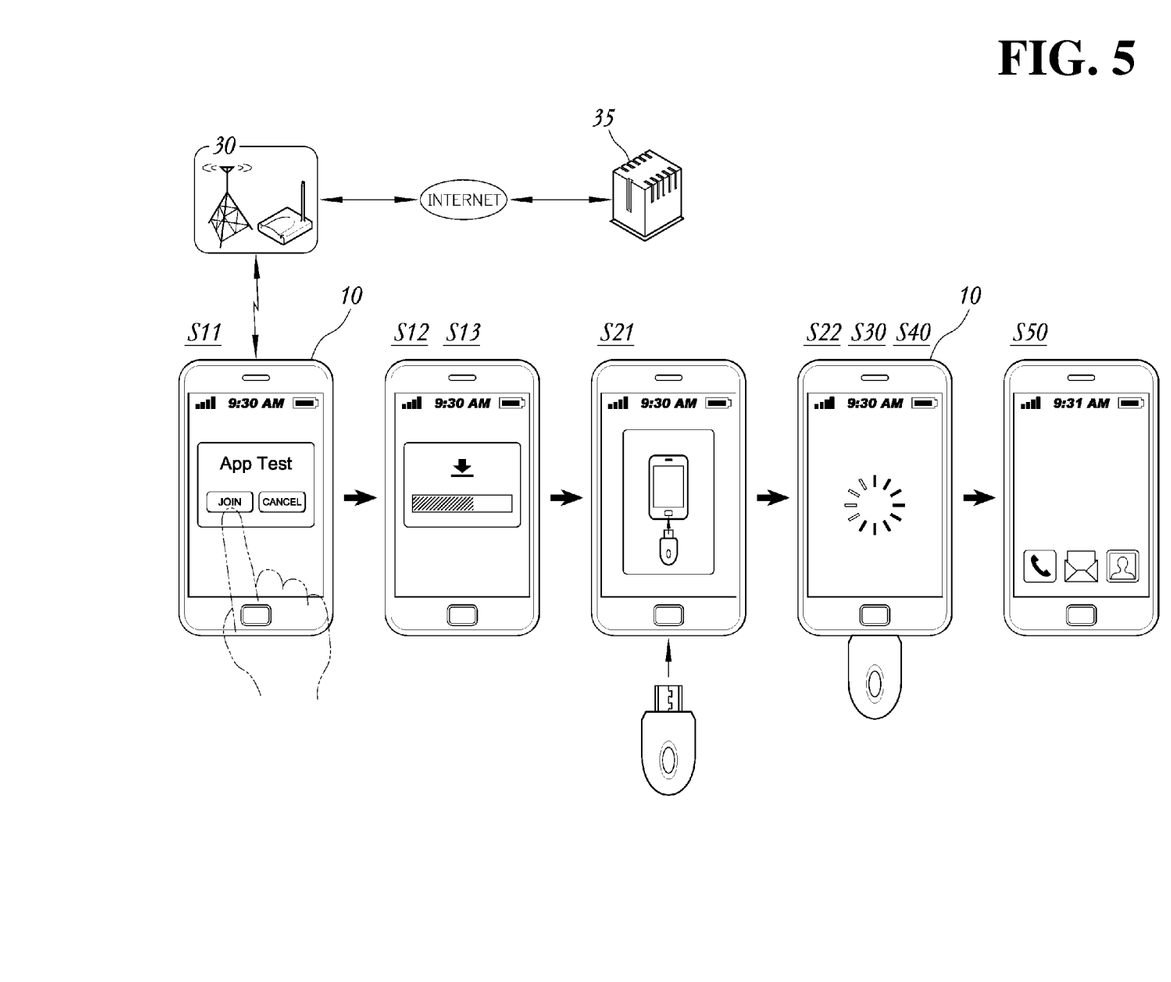
FIG. 5 is an exemplary view showing a smart device screen at each step of the present invention.

Meanwhile, as described above, the present invention recruits a plurality of smart device 10 users as beta testers and excludes direct handling of the beta testers in progressing a real test, and a process of distributing and installing the control program and the target program may be performed online on the basis of a wireless network 30, and a specific process of the same embodiment is shown in FIG. 5.

Such an embodiment based on the wireless network 30 of the present invention is performed by configuring the supervising server 35 connected to the wireless network 30 as shown in FIG. 5. Here, the supervising server 35 is a server operated by the application program manufacturer or the application program test agent described above and performs a function of distributing and managing information on various programs and scripts needed for performing the present invention.

In addition, in the present invention, the wireless network 30 includes a mobile communication network and a wireless LAN, and the smart device 10 is connected to the supervising server 35 through the Internet as the smart device 10, i.e., a smart phone, behaves as a mobile station of the mobile communication network, or as a wireless network adapter of the smart device 10, i.e., a smart phone or a table computer, is connected to the wireless LAN.

As shown in FIG. 5, in the embodiment based on the wireless network 30 of the present invention, the installation step (step S10) is configured of a notification step (step S11), a control program installation step (step S12), and a target program installation step (step S13).

The notification step (step S11) is a step of transmitting test information to the smart device 10 through the wireless network 30 by the supervising server 35, which may be referred to as a process of inquiring participants of the beta test applying the present invention, i.e., the beta testers possessing the booster 20 described above, whether or not to have an intention to participate in the application program test.

At the notification step (step S11), as shown in FIG. 5, the test information is transferred to the smart device 10 through a character message or a push service based on the wireless network 30, and the transmitted test information is displayed on the screen of the smart device 10.

The push service based on the wireless network 30 is a communication method distinguished from a conventional full-type communication method in which a device connected to the wireless network 30 connects to a specific server on the Internet as a client and requests specific information, and it means that a push server connected to the wireless network 30 one-sidedly transmits comparably a small amount of information regardless of whether the device connected to the wireless network 30, i.e., the smart device of the present invention, has requested the information or whether the device connected to the wireless network 30 is connected to the specific server on the Internet, i.e., an information provider.

Such a push service is generally provided by a smart device 10 operating system manufacturer or a communication company, and typical examples thereof are Google Cloud Messaging (GCM) provided by Google, i.e., the manufacturer of Android, and Apple Push Notification Service (APNS) provided by Apple, i.e., the manufacturer of iOS.

Such a push service is generally provided by a smart device 10 operating system manufacturer or a communication company, and typical examples thereof are Google Cloud Messaging (GCM) provided by Google, i.e., the manufacturer of the Android operating system, and Apple Push Notification Service (APNS) provided by Apple, i.e., the manufacturer of iOS operating system.

The test information circulated at the notification step (step S11) is information related to an application program test and may include attribute information of the application program itself, such as a type, a manufacturer and the like of the application program, and characteristic information of the test, such as duration of a time required for a corresponding test, capacity of computing resources and the like, and may also include a Uniform Resource Locator (URL) or the like for downloading a corresponding application program and a control program for progressing a corresponding test.

Particularly, as shown in FIG. 5, a phrase inquiring the intention of the user whether or not to participate in the test and an object such as a button or a link for confirming agreement of the user are included in a character message or a push service message outputted at the notification step (step S11) to download a corresponding application program, control program or the like into the smart device 10 if the user touches a corresponding object.

If the user accepts participation in the test at the notification step (step S11), the control program installation step (step S12) of connecting to the supervising server 35 through the wireless network 30 by the smart device 10 receiving the test information, transmitting the control program to the smart device 10 by the supervising server 35, and installing the control program in the smart device 10, and the target program installation step (step S13) of connecting to the supervising server 35 through the wireless network 30 by the smart device 10 receiving the test information, transmitting the target program to the smart device 10 by the supervising server 35, and installing the target program in the smart device 10 are performed. Here, the control program installation step (step S12) and the target program installation step (step S13) may be performed at the same time or in a reverse order, i.e., it is possible that the target program installation step (step S13) is performed first, and the control program installation step (step S12) is performed later.

If the control program installation step (step S12) and the target program installation step (step S13) are completed like this, this is a state of completing all the preliminary preparations of the application program test through the present invention, and as the connection step (step S20) to the test step (step S50), which are succeeding steps, are performed in order, a test of executing and handling the application program mounted on the smart device 10 can be progressed without handling the smart device 10 by user himself or herself.

In the embodiment based on the wireless network 30 of the present invention as described above, the connection step (step S20) is configured of a connection inducing step (step S21) and a communication path establishing step (step S22) as shown in FIG. 5. The connection inducing step (step S21) is a process of guiding or inducing the user to physically combine the booster 20 that the user possesses with the smart device 10, and the communication path establishing step (step S22) is a process of establishing a logical communication path between the smart device 10 and the booster 20 assuming a physical connection between the two.

That is, the connection inducing step (step S21) of outputting a connection request signal for connecting the smart device 10 and the booster 20 may be performed in a method of outputting a guidance message, image or voice informing to physically combine the booster 20 and the smart device 10 using the data connector 15 through an output device such as a screen, a speaker or the like of the smart device 10 by the control program installed at the installation step (step S10) while the installation step (step S10) described above has been completed, and the user of the corresponding smart device 10 connects the data connector 15 of the booster 20 that the user possesses to the data connector 15 of the smart device 10 according to the guidance of the connection inducing step (step S21).

Although output of the guidance message or the guidance voice at the connection inducing step (step S21) may be performed by the control program installed at the previous step as described above, other than this, this can be performed in the form of an installation completion message of a program at the control program installation step (step S12) or the target program installation step (step S13), which are immediately previous steps.

If the data connector 15 of the booster 20 is physically connected to the data connector 15 of the smart device 10 after the connection inducing step (step S21), the communication path establishing step (step S22) of establishing a communication path between the booster program of the booster 20 and the operating system of the smart device 10 is performed, and as the request step (step S30) to the test step (step S50) of requesting to set an effective permission for the control program through the communication path established like this and conducting a test on an application program by the control program acquiring the effective permission are performed, the automatic test on the application program of the smart device 10 can be efficiently and systematically progressed.

Through the present invention, a test can be automatically conducted without handling a corresponding smart device 10, in which an application program test is conducted, by the user of the smart device 10, and a test on the application program under a variety of conditions can be conducted efficiently and systematically.

Through automatic execution of an application program test of the present invention, even a general user lacking in professional knowledge may participate in an application program test, and therefore, the base of the application program test of the beta test form can be expanded, and the scale of smart devices 10 participating in the test can be extraordinarily expanded, and the cost required for the test can be drastically saved.

Particularly, since various operating environments can be provided in the process of testing an application program through expansion of the scale of smart devices 10 participating in the test, correctness and reliability of the test can be secured.

The present invention provides for simultaneous connections of more than 500,000 global users within cloud grid system for the purpose of providing internet of things (IoT) platform service for web connectivity device

What is claimed is:

1. A method of testing an application program of a smart device using a permission booster by a control program installed in the smart device, the method comprising:
   an installation step (step S10) of installing a test target program and a control program for reading a script and handling the test target program in the smart device;
   a connection step (step S20) of directly connecting the permission booster mounted with a booster program to a data connector of the smart device, the permission booster having a corresponding data connector and a memory;
   a request step (step S30) of automatically transmitting identification information of the control program to an operating system of the smart device and automatically requesting grant of an effective permission to the control program by the booster program of the permission booster by way of the data connector upon connection of the permission booster to the smart device;

an acceptance step (step S40) of automatically granting the effective permission to the control program by the operating system of the smart device upon receiving the identification information of the control program and the request for the grant of the effective permission to the control program;

subsequent to the acceptance step, a disconnection step of disconnecting the permission booster from the smart device; and subsequent to the disconnection step, a test step (step S50) of handling the test target program by the control program.

2. The method according to claim 1, wherein the operating system of the smart device is an Android operating system, the data connector of the smart device and the data connector of the permission booster are Universal Serial Buses (USBs), an Android Debug Bridge (ADB) server is installed in the permission booster, and an ADB daemon is installed in the smart device;

the connection step (step S20) including automatically establishing a Transmission Control Protocol/Internet Protocol (TCP/IP) communication path through the USBs;

the request step (step S30) including automatically transmitting by the ADB server a command to the ADB daemon through the TCP/IP communication path under a control of the booster program; and the acceptance step (step S40) including automatically granting by the operating system of the smart device the effective permission to the control program as the ADB daemon receives the command.

3. The method according to claim 1, wherein a supervising server connected to a wireless network is configured, and the installation step (step S10) includes:

a notification step (step S11) of transmitting test information to the smart device through the wireless network by the supervising server;

a control program installation step (step S12) of connecting to the supervising server through the wireless network by the smart device receiving the test information, transmitting the control program to the smart device by the supervising server, and installing the control program in the smart device; and a target program installation step (step S13) of connecting to the supervising server through the wireless network by the smart device receiving the test information, transmitting the test target program to the smart device by the supervising server 35, and installing the target program in the smart device are performed, and the connection step (step S20) includes:

a connection inducing step (step S21) of outputting a connection request signal for connecting the smart device and the permission booster; and a communication path establishing step S22 of establishing, if the data connector of the smart device is connected to the data connector of the permission booster, a communication path between the booster program of the permission booster and the operating system of the smart device.

4. The method according to claim 1, wherein the acceptance step (step S40) includes granting the effective permission to the control program only to handle the test target program by the operating system of the smart device.

5. The method according to claim 1, wherein the permission booster comprises only the booster program, the data connector, the memory; and a processor.

6. The method according to claim 1, wherein the permission booster is configured only to be connected to a single smart device at a time.

7. The method according to claim 1, wherein the request step (step S30) and the acceptance step (step S40) are performed without ever requiring manual authorization from a user.

8. The method according to claim 1, wherein the acceptance step (step S40) of automatically granting the effective permission to the control program is performed when the permission booster has never previously been connected to the smart device.

9. The method according to claim 1, wherein the acceptance step (step S40) includes limiting the effective permission by the operating system to only allow handling of the test target program and restricting access to other data on the smart device.

10. The method according to claim 1, wherein the control program is distinct from the ADB daemon.

11. A method of testing programs on a smart device, the method comprising: installing a target program and a control program for reading a script and testing the target program on the smart device;

directly connecting a first data connector on a permission booster to a corresponding second data connector on the smart device, the permission booster being configured to only connect to a single smart device at a time;

automatically transmitting identification information of the control program to an operating system on the smart device;

automatically transmitting a request for grant of an effective permission to allow the control program to test the target program on the smart phone by a booster program stored in a memory on the permission booster through the first and second data connectors when the permission booster is connected to the smart device;

automatically granting the effective permission to the control program by the operating system of the smart device when the smart device receives the identification information of the control program and the request for grant of the effective permission to the control program upon a brand new connection between the permission booster and the smart device;

subsequent to automatically granting the effective permission but prior to testing the target program, disconnecting the permission booster from the smart device;

and subsequent to the disconnecting of the permission booster from the smart device, testing the target program by the control program.

12. The method of claim 11, wherein automatically granting the effective permission includes granting the effective permission only to test the target program by the control program.

13. The method of claim 11, wherein the permission booster comprises only the booster program, the first data connector, the memory; and a processor.

* * * * *